United States Patent
Cherry et al.

(10) Patent No.: US 12,449,374 B2
(45) Date of Patent: Oct. 21, 2025

(54) GLASS INSPECTION

(71) Applicant: Pilkington Group Limited, Lathom (GB)

(72) Inventors: Simon Cherry, Wigan (GB); Ian Ross Williams, Wigan (GB); Andrew Thomson, Newton-le-Willows (GB)

(73) Assignee: Pilkington Group Limited, Lathom (GB)

( * ) Notice: Subject to any disclaimer, the term of this patent is extended or adjusted under 35 U.S.C. 154(b) by 177 days.

(21) Appl. No.: 18/262,212

(22) PCT Filed: Jan. 21, 2022

(86) PCT No.: PCT/GB2022/050171
§ 371 (c)(1),
(2) Date: Jul. 20, 2023

(87) PCT Pub. No.: WO2022/157505
PCT Pub. Date: Jul. 28, 2022

(65) Prior Publication Data
US 2024/0085342 A1 Mar. 14, 2024

(30) Foreign Application Priority Data
Jan. 22, 2021 (GB) .................................. 2100905

(51) Int. Cl.
*G01N 21/896* (2006.01)
*G01N 21/88* (2006.01)
*G01N 21/89* (2006.01)

(52) U.S. Cl.
CPC ....... *G01N 21/896* (2013.01); *G01N 21/8806* (2013.01); *G01N 21/8851* (2013.01);
(Continued)

(58) Field of Classification Search
CPC ............ G01N 21/896; G01N 21/8806; G01N 21/8851; G01N 21/8901; G01N 2021/8809; G01N 2021/8835; G01N 2021/8867
See application file for complete search history.

(56) References Cited

U.S. PATENT DOCUMENTS

2010/0060889 A1\* 3/2010 Iwai ..................... G01N 21/896
356/237.5

FOREIGN PATENT DOCUMENTS

CN 204359710 U 5/2015
CN 105259189 A 1/2016
(Continued)

OTHER PUBLICATIONS

UK Intellectual Property Office, Search Report in Application GB2100905.5, dated Jun. 22, 2021, 5 pages. United Kingdom.
(Continued)

*Primary Examiner* — Jamil Ahmed
(74) *Attorney, Agent, or Firm* — Marshall & Melhorn, LLC

(57) ABSTRACT

A method of detecting a defect in a sheet of glass includes: (i) directing a converging beam from a source of illumination onto a surface of the sheet of glass to illuminate the defect; (ii) focusing an image capture device onto a first plane to image the defect in the sheet of glass; (iii) capturing a first image of the defect; (iv) carrying out an adjustment step; and (v) capturing a second image of the defect. Each of the first and second images has a respective first portion from the illuminated defect and a respective second portion due to reflection of a portion of the beam from the glass surface. In the first image of the defect the first portion is brighter than the second portion, and in the second image of
(Continued)

the defect the first portion is darker than the second portion. An apparatus for carrying out the method is also provided.

20 Claims, 2 Drawing Sheets

(52) U.S. Cl.
CPC . *G01N 21/8901* (2013.01); *G01N 2021/8809* (2013.01); *G01N 2021/8835* (2013.01); *G01N 2021/8867* (2013.01)

(56) References Cited

FOREIGN PATENT DOCUMENTS

| | | | |
|---|---|---|---|
| CN | 109632828 A | 4/2019 | |
| JP | 2011043415 A | 3/2011 | |
| JP | 2017173106 A | 9/2017 | |
| KR | 1020190001789 A | 1/2019 | |
| WO | 0026647 A1 | 5/2000 | |
| WO | 2017204560 A1 | 11/2017 | |

OTHER PUBLICATIONS

European Patent Office, International Search Report and Written Opinion in Application No. PCT/GB2022/050171, dated Apr. 19, 2022, 10 pages, Rijswijk, Netherlands.
Japanese Patent Office, Office Action in Application No. JP2023-544385, dated Jul. 15, 2025, 11 pages.

\* cited by examiner

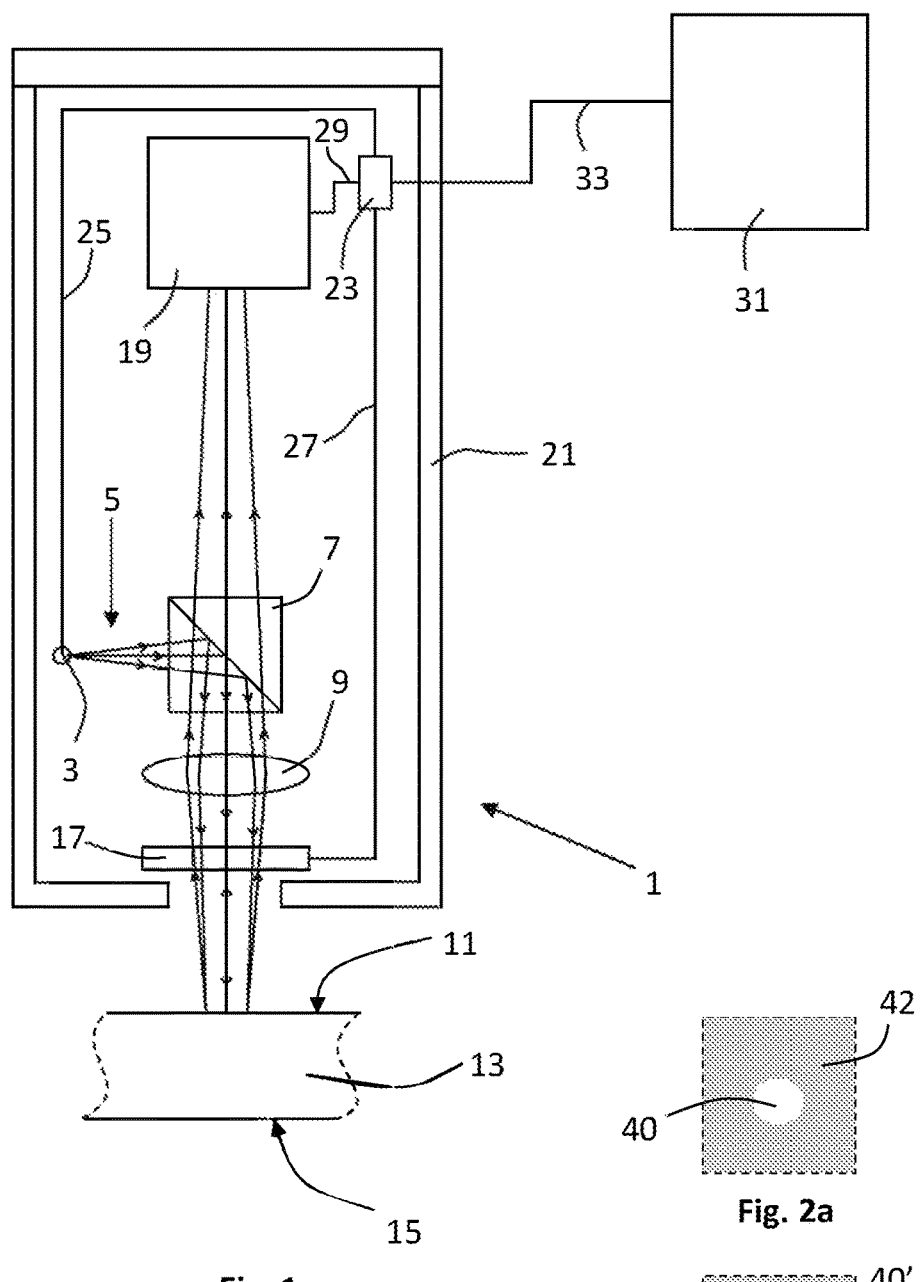
Fig. 1
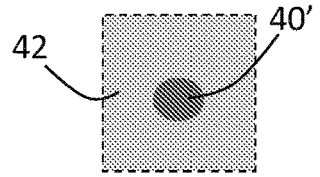
Fig. 2a
Fig. 2b
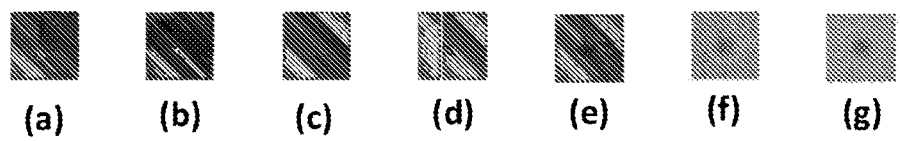
Fig. 3

GLASS INSPECTION

BACKGROUND OF THE INVENTION

The present invention relates to a method of detecting a defect in a sheet of glass and to apparatus for determining the presence of a defect in a sheet of glass.

It is known in the art that glass may be made into sheet form using a variety of different forming processes, including a float process, a downdraw process and a rolled process.

During production of the glass sheets, one or more defect may be introduced into a glass sheet to reduce the optical quality thereof. For example, bubbles and/or refractory particles (often known as "inclusions") and/or refractive index variations (often referred to as "ream") may be introduced into a glass sheet as a defect to alter the optical quality of the glass sheet. A defect may cause one or more optical effect in the glass, for example a refractory particle may by visible by the human eye and/or may cause refractive index variations around the refractory particle that create optical distortion. Measures may be taken to reduce the number of defects, and often there are predetermined quality criteria related to each type of defect.

Different defects typically have a different optical effect in the glass sheet making it possible to detect and discriminate different defects using different inspection systems. Such inspection systems are commercially available from companies including ISRA VISION AG, Germany, see the following website https://www.isravision.com/en/glass/applications/float-glass/float-glass-for-architecture/ and also from Dr. Schenk GmbH, Germany (https://www.drschenk.com/products/glass-inspection/float-glass-inspection.html).

Other inspection systems for glass sheets are known in the art.

WO00/26647A1 describes an inspection system for a sheet of glass comprising a first laser and a second laser, each of which provide a sheet of light, a cylindrical lens system, and a first light detection system and a second light detection system. The first laser is located at the focal point of the lens system. The second laser is located at a distance from the lens system that is greater than that of the first laser, and off of the axis of the lens system. The first light detection system receives light from the first laser and the second light detection system receives light from the second laser. The inspection system is adapted to position a sheet of glass between the lens system and the detection systems.

KR10-2019-0001789A1 describes a multi-optical display inspecting device. The multi-optical display inspecting device comprises: a curved surface lighting which irradiates a curved edge formed on an object to be inspected with a light so as to show a defect of the edge; and a camera for capturing the object to be inspected and generating a capturing image including a curved capturing area, wherein the curved surface lighting comprises: a light source; and a curved reflection plate allowing light to be incident from the light source and reflecting the incident light to the curved edge.

CN105259189A describes a glass defect imaging system comprising a first light source, a second light source and an image collection device, wherein both the first light source and the second light source are strip-shaped light sources comprising LED lamp bead module groups. The first light source is located on a lower side of the glass and the second light source is located on an upper side of the glass. The first light source and the second light source irradiate the same area of the glass in certain angles, and transmission light produced by the first light source and reflected light produced by the second light source can pass through principal optic axes of camera lenses of the image collection device in parallel. The first light source and the second light source perform lighting mode switching according to a pre-set system, and different lighting effects of bright field transmission, bright field reflection, dark field transmission and dark field reflection are formed on the glass. The image collection device is used for completing glass imaging collection under all lighting effects during the period that the system is completely executed once. According to the glass defect imaging system, image information in multiple lighting modes is sufficiently utilized to position and identify defects of the glass surface, and types of the defects of the glass surface can be judged comprehensively and accurately.

CN204359710U describes a glass surface defect detection device which comprises an upper detection imaging light path and a lower detection imaging light path. The upper detection imaging light path comprises an upper bright field illumination line light source, a dark field illumination line light source, an upper surface scanning and imaging objective lens and an upper linear array image sensor. The lower detection imaging light path comprises a lower bright field illumination line light source, a backlight illumination line light source, a mirror, a lower surface scanning and imaging objective lens and a lower linear array image sensor. The glass surface defect detection device can detect cover glass quality problems in the processes of electronic product production, processing, assembling and the like, can efficiently detect various defects of cover glass during scanning, enhances quality control of the cover glass, and improves the overall quality of the cover glass.

SUMMARY OF THE INVENTION

In the float process of making glass sheets, it is well known that molten glass is formed into a glass ribbon by floating the molten glass on the surface of a bath of molten tin enclosed in a "float bath". The ribbon is subsequently annealed and cut into glass sheets. Due to the forming process including the step of floating molten glass on the surface of molten tin in the float bath, there is potential for tin defects to be present in or on the formed glass ribbon that may cause a defect in or on the glass sheets. Tin defects may occur on or close to the surface of the glass sheet not in contact with the molten tin during forming (said surface often referred to as the "air surface" or "top surface" of the glass sheet), see for example "Ceramic Engineering and Science Proceedings 27(1):19-46" and U.S. Pat. No. 4,236,906.

A problem with the presence of tin defects on or close to the surface of a glass sheet that has not been in contact with molten tin during forming is that this glass surface may also include other defects such as dust, dirt and scratches thereon after the glass sheet has been formed. Also, there is a need to distinguish between a tin defect that may be on the surface of the glass sheet that has been in contact with molten tin during forming and a tin defect that may be on or at least partially below the surface of the glass sheet that has not been in contact with the molten tin during forming. Whilst both type of defect are "tin defects", they affect optical quality differently and may be caused by different conditions whilst forming. It is therefore also important to be able to distinguish between such tin defects so that the appropriate corrective measures may be taken during forming.

The present invention at least partially addresses the above and provides an alternative method for detecting defects in a sheet of glass, in particular defects on or close to a surface of a sheet of glass due to particles such as tin-containing particles being deposited on the top surface of a sheet of glass formed by a float process.

Accordingly, the present invention provides from a first aspect a method of detecting a defect in a sheet of glass, the sheet of glass having a first major surface and a second opposing major surface, the method comprising the steps: (i) directing a beam from a source of illumination onto the first major surface of the sheet of glass to illuminate the defect in the sheet of glass, the beam that strikes the first major surface of the sheet of glass being a converging beam having a first focal point; (ii) focussing an image capture device onto a first plane to image the defect in the sheet of glass, the image capture device being at a first position relative to the defect; (iii) using the image capture device to capture a first image of the defect, the first image comprising a first portion from the illuminated defect and a second portion due to reflection of at least a portion of the beam from the first major surface of the glass sheet; (iv) carrying out an adjustment step; (v) using the image capture device to capture a second image of the defect, the second image comprising a first portion from the illuminated defect and a second portion due to reflection of at least a portion of the beam from the first major surface of the glass sheet; wherein in the first image of the defect the first portion is brighter than the second portion, and in the second image of the defect the first portion is darker than the second portion.

Preferably the beam is a beam of electromagnetic radiation comprising electromagnetic radiation having at least one wavelength between 300 nm and 10 μm, preferably between 300 nm and 2500 nm, more preferably between 300 nm and 1500 nm, even more preferably between 300 nm and 1100 nm.

Preferably the beam is a beam of light comprising electromagnetic radiation having at least one wavelength between 380 nm and 780 nm.

For the avoidance of doubt, when a defect is in a sheet of glass, this includes the defect being in the body of the sheet of glass, the defect being on a surface of the sheet of glass and the defect being at least partially beneath a surface of the sheet of glass.

Certain defects are created in the sheet of glass when particles are deposited on the first major surface of the sheet of glass when the sheet of glass is being formed. The viscosity of the glass when the sheet of glass is being formed is sufficiently low such that depositing a particle thereon may cause a shape change to the surface of the sheet of glass locally around the particle. As the glass is cooled, the local shape change to the surface of the sheet of glass around the particle is essentially "frozen-in". Consequently, the defect that is detected in accordance with the first aspect of the present invention may comprise the particle in the sheet of glass and the local shape change of the glass surface surrounding the particle. If after the glass sheet is formed the particle that caused the local shape change of the glass surface surrounding the particle is subsequently removed from the glass sheet, for example because the particle is not fully embedded in the sheet of glass, a defect still remains in the sheet of glass due to the local shape change of the glass surface that occurred when the particle was originally deposited as discussed above.

In either case described above, the local shape change of the surface of the sheet of glass that was frozen-in causes an adjustment of the path of the beam received by the image capture device such that the defect (with or without the particle that caused local shape change of the surface of the sheet of glass) appears bright or dark against the background of the surrounding glass depending upon the path from the defect to the image capture device. The present invention makes use of this finding, and by using the adjustment step in step (iv) there is provided a detection method that is able to discriminate between different types of defect that may be present in a sheet of glass.

The adjustment step may be used to adjust the path of a ray from the source of illumination to the defect and/or from the defect to the image capture device.

Preferably the adjustment step comprises adjusting the first focal point of the converging beam to a second focal point so that the beam striking the first major surface is a converging beam having the second focal point.

Preferably the adjustment step comprises focusing the image capture device onto a second plane to image the defect with the image capture device focused onto the second plane.

Preferably the adjustment step comprises moving the image capture device to a second position relative to the defect.

As is evident from the above, preferably the adjustment step comprises one or more of the following steps: (a) adjusting the first focal point of the converging beam to a second focal point so that the beam striking the first major surface is a converging beam having the second focal point, (b) focussing the image capture device onto a second plane to image the defect with the image capture device focussed onto the second plane and (c) moving the image capture device to a second position relative to the defect. Moving the image capture device to a second position relative to the defect may be carried out by moving at least one of the image capture device and the defect relative to the other.

Preferably in the first image of the defect, the first portion of the first image is surrounded by the second portion of the first image, more preferably the first portion of the first image is totally surrounded by the second portion of the first image.

Preferably in the second image of the defect, the first portion of the second image is surrounded by the second portion of the second image, more preferably the first portion of the second image is totally surrounded by the second portion of the second image.

Preferably the first plane is aligned with the first major surface of the sheet of glass.

At step (ii), when the image capture device is at the first position relative to the defect, the image capture device is also at a first position relative to the first plane and at a first position relative to the first and second major surfaces of the sheet of glass.

Preferably at step (i) positive optical power is added to the beam before the beam strikes the first major surface of the sheet of glass, more preferably between 0.01 dioptres and 100 dioptres positive optical power is added to the beam before the beam strikes the first major surface of the sheet of glass, even more preferably between 0.01 dioptres and 50 dioptres positive optical power is added to the beam before the beam strikes the first major surface of the sheet of glass. It is preferred to add optical power to the beam before the beam strikes the first major surface of the sheet of glass by using a lens or a mirror.

Preferably at step (i) negative optical power is added to the beam before the beam strikes the first major surface of the sheet of glass. It is preferred that between 0.01 dioptres and 10 dioptres negative optical power is added to the beam before the beam strikes the first major surface of the sheet of glass. Negative power is preferably added to the beam before the beam strikes the first major surface of the sheet of glass by a lens, more preferably an adjustable lens, even more preferably a computer adjustable lens.

Preferably at step (iv) the image capture device remains focussed onto the first plane so that during step (v) the image capture device is focussed onto the first plane when the second image of the defect is captured by the image capture device.

Preferably at step (iv) the image capture device remains at the first position relative to the defect such that at step (v) the second image of the defect is taken with the image capture device at the first position relative to the defect.

Preferably at step (iv) the first focal point of the converging beam is adjusted to a second focal point wherein the second focal point is further from the source of illumination than the first focal point.

Preferably at step (iv) positive optical power is added to the beam after the beam strikes the first major surface of the sheet of glass, more preferably between 0.01 dioptres and 100 dioptres positive optical power is added to the beam after the beam strikes the first major surface of the sheet of glass, even more preferably between 0.01 dioptres and 50 dioptres positive optical power is added to the beam after the beam strikes the first major surface of the sheet of glass. It is preferred to add optical power to the beam after the beam strikes the first major surface of the sheet of glass by using a lens or a mirror.

Preferably at step (iv) negative optical power is added to the beam after the beam strikes the first major surface of the sheet of glass. It is preferred that between 0.01 dioptres and 10 dioptres negative optical power is added to the beam after the beam strikes the first major surface of the sheet of glass. Negative power is preferably added to the beam after the beam strikes the first major surface of the sheet of glass by a lens, more preferably an adjustable lens, even more preferably a computer adjustable lens.

Preferably the defect comprises a localised shape change of the first major surface of the sheet of glass, the localised shape change of the first major surface of the sheet of glass being caused by a particle that was deposited onto the first major surface of the glass sheet during the formation of the glass sheet. Preferably the particle is spherical, or substantially spherical.

Preferably the defect comprises tin or an oxide of tin or was caused by a particle comprising tin or tin oxide.

Preferably the defect being detected comprises a spherical portion, or a substantially spherical portion.

Preferably the defect being detected comprises a portion that is at least partially submerged beneath the first major surface of the sheet of glass.

Preferably the defect being detected has a first portion and a second portion, wherein the first portion of the defect is above the first major surface of the sheet of glass and the second portion of the defect is below the first major surface of the sheet of glass.

Preferably the defect being detected has a major axis having a length less than 200 µm, or less than 150 µm, or less than 100 µm, or less than 90 µm, or less than 80 µm, or less than 70 µm, or less than 60 µm, or less than 50 µm.

Preferably the defect being detected has a major axis having a length greater than 0.5 µm, or greater than 5 µm, or greater than 10 µm, or greater than 20 µm, or greater than 40 µm.

When the defect comprises a spherical portion, or a substantially spherical portion, the major axis corresponds to the diameter of the spherical portion.

Preferably the first portion of the first image and/or the first portion of the second image is used to determine a parameter related to the shape of the defect. In such embodiments, the method preferably includes a step to determine the parameter related to the shape of the defect after the first image has been taken and/or a step to determine the parameter related to the shape of the defect after the second image has been taken. This provides an additional step to allow the defect being detected to be classified as a defect of interest or not. For example, if the defect of interest is spherical, and the parameter related to the shape of the defect is the circularity of the defect, the circularity may be used to determine if a defect is spherical or not, for example an elongate line such as a surface scratch, so that the defect can be correctly included in the defect of interest count or not.

Preferably the parameter related to the shape of the defect is the shape of the defect and/or the shape of a particle that caused the defect.

Preferably the image capture device comprises at least a first camera, in particular at least a first digital camera. Preferably the first digital camera comprises a line scan camera or an area scan camera.

Preferably the source of illumination emits a range of wavelengths, and wherein the beam comprises the same range of wavelengths as the source of illumination or a narrower range of wavelengths of the source of illumination. The narrower range of wavelengths may be produced by suitably positioning a filter to filter the range of wavelengths emitted by the source of illumination.

Preferably the source of illumination comprises at least one light emitting diode, in particular an infrared, red, green, yellow or blue light emitting diode Preferably the source of illumination comprises at least one incandescent light source such as a tungsten filament light bulb.

Preferably the source of illumination comprises at least one laser.

Preferably the source of illumination has a first hue, and wherein the first image and/or the second image is a monochromatic image having the same hue at different levels of intensity thereof.

Preferably the beam is a stopped beam from the source of illumination, the stopped beam passing through a least a first aperture positioned between the source of illumination and the first major surface of the sheet of glass.

Preferably the source of illumination comprises an illumination generating portion and a scattering portion for scattering rays produced by the illumination generating portion. Preferably the scattering portion is a body portion and the illumination generating portion is inside the body portion. The scattering portion may be used to improve the illumination of the defect.

Preferably an optical axis of the beam strikes the first major surface of the sheet of glass at an angle of incidence greater than 45°, preferably between 50° and 140°, more preferably between 80° and 100°. The angle of incidence is defined in relation to a tangent at the point on the first major surface where the optical axis of the beam strikes the first major surface.

In some embodiments the beam is a beam of light comprising electromagnetic radiation having at least one wavelength between 380 nm and 780 nm.

Preferably at step (i) positive optical power is added to the beam of light before the beam of light strikes the first major surface of the sheet of glass, more preferably between 0.01 dioptres and 100 dioptres positive optical power is added to the beam of light before the beam of light strikes the first major surface of the sheet of glass, even more preferably between 0.01 dioptres and 50 dioptres positive optical power is added to the beam of light before the beam of light strikes the first major surface of the sheet of glass. It is preferred to add optical power to the beam of light before the beam of light strikes the first major surface of the sheet of glass using a lens or a mirror.

Preferably at step (i) negative optical power is added to the beam of light before the beam of light strikes the first major surface of the sheet of glass. It is preferred that between 0.01 dioptres and 10 dioptres negative optical power is added to the beam of light before the beam of light strikes the first major surface of the sheet of glass. Negative power is preferably added to the beam of light before the beam of light strikes the first major surface of the sheet of glass by a lens, more preferably an adjustable lens, even more preferably a computer adjustable lens.

Preferably at step (iv) the first focal point of the converging beam of light is adjusted to a second focal point wherein the second focal point is further from the light source than the first focal point.

Preferably at step (iv) positive optical power is added to the beam of light after the beam of light strikes the first major surface of the sheet of glass, more preferably between 0.01 dioptres and 100 dioptres positive optical power is added to the beam of light after the beam of light strikes the first major surface of the sheet of glass, even more preferably between 0.01 dioptres and 50 dioptres positive optical power is added to the beam of light after the beam of light strikes the first major surface of the sheet of glass. It is preferred to add optical power to the beam of light after the beam of light strikes the first major surface of the sheet of glass using a lens or a mirror.

Preferably at step (iv) negative optical power is added to the beam of light after the beam of light strikes the first major surface of the sheet of glass. It is preferred that between 0.01 dioptres and 10 dioptres negative optical power is added to the beam of light after the beam of light strikes the first major surface of the sheet of glass. Negative power is preferably added to the beam of light after the beam of light strikes the first major surface of the sheet of glass by a lens, more preferably an adjustable lens, even more preferably a computer adjustable lens.

Preferably the light source comprises a light generating portion and a light scattering portion. Preferably the light scattering portion is a body portion and the light generating portion is inside the body portion. The light scattering portion may be used to improve the illumination of the defect. A suitable light scattering portion comprises translucent plastic.

In some embodiments the second portion of the first image and/or the second portion of the second image is used to determine a parameter related to the shape of the defect, or the shape of the defect.

In some embodiments the first plane is aligned with the first major surface of the sheet of glass, and wherein prior to step (ii) the method includes a distance measuring step to determine a position of the first major surface of the sheet of glass relative to the image capture device so that during step (ii) the image capture device can be focussed onto the first major surface of the sheet of glass.

In some embodiments the defect comprises a localised shape change of the first major surface of the sheet of glass, the localised shape change of the first major surface of the sheet of glass being caused by a particle that was deposited onto the first major surface of the glass sheet during the formation of the glass sheet, wherein the particle comprises tin or an oxide of tin.

Preferably the particle is spherical, or substantially spherical.

Preferably the particle is at least partially submerged beneath the first major surface of the sheet of glass.

In some embodiments the defect comprises a localised shape change of the first major surface of the sheet of glass, the localised shape change of the first major surface of the sheet of glass being caused by a particle that was deposited onto the first major surface of the glass sheet during the formation of the glass sheet, and the particle that caused the localised shape change of the first major surface of the sheet of glass is not in the sheet of glass when any or all of the steps (i), (ii), (iii), (iv) or (v) are carried out.

In some embodiments the image capture device comprises a first camera and a second camera, preferably a first digital camera and/or a second digital camera.

Preferably the first camera is used to acquire the first image and the second camera is used to acquire the second image.

In some embodiments the first image and/or the second image is a monochromatic image.

Preferably the first image is a monochrome image having a first image hue.

Preferably the second image is a monochrome image having a second image hue.

Preferably the first image hue is the same as the second image hue.

Preferably the first image is a greyscale image.

Preferably the second image is a greyscale image.

Preferably the first image has at least an 8 bit pixel depth, or at least a 10 bit pixel depth, or at least a 12 bit pixel depth, or at least a 16 bit pixel depth.

Preferably the second image has at least an 8 bit pixel depth, or at least a 10 bit pixel depth, or at least a 12 bit pixel depth, or at least a 16 bit pixel depth.

In some embodiments when negative optical power is added to the beam before the beam strikes the first major surface, at step (iv) the image capture device remains focused onto the first plane and the focal point of the converging beam is adjusted from the first focal point to the second focal point by removing the negative optical power that was added at step (i).

In such embodiments, if during step (i) negative optical power is added to the beam before the beam strikes the first major surface of the sheet of glass by use of a lens, removal of the lens from the beam path removes the negative optical power that is added to the beam during step (i).

Alternatively, if during step (i) negative optical power is added to the beam before the beam strikes the first major surface of the sheet of glass by use of an adjustable lens having a first focal point, at step (iv) the first focal point of the adjustable lens is adjusted to remove some or all of the negative optical power that is added to the beam during step (i).

In some embodiments when the beam is a beam of light and negative optical power is added to the beam of light before the beam of light strikes the first major surface, at step (iv) the image capture device remains focused onto the first plane and the focal point of the converging beam of light is adjusted from the first focal point to the second focal point by removing the negative optical power that was added at step (i).

In such embodiments, if during step (i) negative optical power is added to the beam of light before the beam of light strikes the first major surface of the sheet of glass by use of a lens, removal of the lens from the light path removes the negative optical power that is added to the beam of light during step (i).

Alternatively, if during step (i) negative optical power is added to the beam of light before the beam of light strikes the first major surface of the sheet of glass by use of an adjustable lens having a first focal point, at step (iv) the first focal point of the adjustable lens is adjusted to remove some or all of the negative optical power that is added to the beam of light during step (i).

In some embodiments, brightness is determined from a monochromatic first image and second image, where high brightness is white and low brightness is black, with different shades of hue in between.

Preferably the image has at least an 8 bit pixel depth, or at least a 10 bit pixel depth, or at least a 12 bit pixel depth, or at least a 16 bit pixel depth. Pixel depth outside this range may be used as appropriate, for example greater than at least 16 bit pixel depth.

Suitably the lowest brightness level of a pixel in the image is 0 and the highest brightness level of a pixel in the image is $2^n-1$, where n is the bit rate of the pixel depth.

Suitably the lowest brightness level of a pixel in the image is $-(2^n-1)/2$ and the highest brightness level of a pixel in the image is $+(2^n-1)/2$, where n is the bit rate of the pixel depth.

Suitably the monochrome image is a greyscale image, although a different hue may be used, for example, red, green or blue or combination thereof In some embodiments, the defect being detected is a first defect of a plurality of defects in the sheet of the glass, the plurality of defects also comprising at least a second defect, the first defect being detected initially by carrying out steps (i) (ii) and (iii) and then the second defect being detected by carrying out steps (i) (ii) and (iii), thereafter steps (iv) and (v) being carried out to detect the first defect, followed by steps (iv) and (v) being carried out to detect the second defect.

Preferably the first defect or second defect is detected by moving the sheet of glass relative to the image capture device and/or the source of illumination.

Preferably the first defect is detected initially by carrying out steps (i) (ii) and (iii) with the image capture device at a first position relative to the sheet of glass, thereafter the image capture device is moved relative to the sheet of glass and the second defect is detected initially by carrying out steps (i) (ii) and (iii) with the image capture device being at a second position relative to the sheet of glass, wherein the image capture device and/or the sheet of glass is moved such that the image capture device is at the first position relative to the sheet of glass in order to carry out steps (iv) and (v) to detect the defect.

Preferably the image capture device and/or the sheet of glass is moved such that the image capture device is at the second position relative to the sheet of glass in order to carry out steps (iv) and (v) to detect the second defect.

It is preferred that a distance from the first defect to the image capture device when the first defect is detected is the same as a distance from the second defect to the image capture device when the second defect is detected.

In some embodiments the position of the image capture device is fixed relative to the source of illumination.

In some embodiments the beam that illuminates the first major surface shares an optical axis with at least a reflected ray from the first major surface of the sheet of glass to the image capture device.

In some embodiments, the sheet of glass has been produced using a float process, and the first major surface has not been in contact with molten tin when the sheet of glass was formed.

It is within the scope of the first aspect of the present invention that steps (iv) and (v) take place before steps (i), (ii) and (iii), and that steps (i), (ii) and (iii) occur in this sequence. When the first aspect of the present invention is carried out this way, step (v) is preferably carried out before step (iv). Also, when the first aspect of the present invention is carried out this way, the first image that is taken by the image capture device has the first portion darker than the second portion thereof, and the second image taken has the first portion brighter than the second portion. It is not preferred to use the method in this way because the image that is taken first does not allow discrimination of the defect from other defects that in the second image will have the first portion brighter than the second portion. For example, a dust particle on the glass surface may give rise to a first image where the first portion is darker than the second portion, and a second image wherein the first portion is also darker than the second portion. As such, when using the present invention in this way, each defect will have to be inspected twice to ensure the defect is the particular defect of interest.

However, it is preferred to carry out the method using steps (i), (ii), (iii), (iv) and (v) in this order because only when a first image has a first portion brighter than the second portion is it necessary to carry out steps (iv) and (v) to determine if the defect is a defect of interest. When the first aspect of the present invention is carried out this way, the first image that is taken by the image capture device at step (iii) has the first portion brighter than the second portion thereof, and the second image taken by the image capture device at step (v) has the first portion darker than the second portion.

In some embodiments the method comprises steps (i), (ii), (v), (iv), (iii) in this order. When the first aspect of the present invention is carried out this way, the first image that is taken by the image capture device at step (v) before the adjustment step (iv) has the first portion darker than the second portion thereof, and the second image taken by the image capture device at step (iii) after the adjustment step (iv) has the first portion brighter than the second portion.

In some embodiments the beam is a light beam and the source of illumination is a light source such that the method comprises the steps: (i) directing the light beam from the light source onto the first major surface of the sheet of glass to illuminate the defect in the sheet of glass, the light beam that strikes the first major surface of the sheet of glass being a converging beam of light having a first focal point; (ii) focusing an image capture device onto a first plane to image the defect in the sheet of glass, the image capture device being at a first position relative to the defect; (iii) using the image capture device to capture a first image of the defect, the first image of the defect comprising a first portion due to light from the illuminated defect and a second portion due to light reflected from the first major surface of the glass sheet; (iv) carrying out an adjustment step; (v) using the image capture device to capture a second image of the defect, the second image of the defect comprising a first portion due to light from the illuminated defect and a second portion due to light reflected from the first major surface of the glass sheet; wherein in the first image of the defect the first portion is brighter than the second portion, and in the second image of the defect the first portion is darker than the second portion.

Preferably the adjustment step comprises adjusting the first focal point of the converging beam of light to a second focal point so that the light beam striking the first major surface is a converging beam of light having the second focal point.

Preferably the adjustment step comprises focusing the image capture device onto a second plane to image the defect with the image capture device focused onto the second plane.

The present invention also provides from a second aspect an apparatus for determining the presence of a defect in a sheet of glass, the sheet of glass having a first major surface and a second opposing major surface, the apparatus comprising a source of illumination for illuminating a portion of the first major surface of the sheet of glass containing the defect with a converging beam having a first focal point; an image capture device for taking a first image of the illuminated defect when the image capture device is at a first position relative to the defect and focused onto a first plane; and at least one of an adjustment means for adjusting the focal point of the converging beam to a second focal point while the image capture device remains focused onto the first plane, a focusing means for focusing the image capture device onto a second plane to image the defect with the image capture device focused onto the second plane and a moving means for moving the image capture device to a second position relative to the defect.

Each of the adjustment means, the focusing means and the moving means may be part of the apparatus either alone or in combination with one or two of the others to provide an apparatus that is able to carry out methods according to the first aspect of the present invention.

Preferably the defect is on or close to the first major surface of the sheet of glass.

Preferably the first major surface of the sheet of glass is the air surface of a sheet of glass formed by a float process.

Preferably the beam has an optical axis arranged to strike the first major surface of the sheet of glass at an angle of incidence greater than 45°, preferably between 50° and 140°, more preferably between 80° and 100°.

Preferably the source of illumination emits electromagnetic radiation having at least one wavelength between 300 nm and 10 µm, preferably between 300 nm and 2500 nm, more preferably between 300 nm and 1500 nm, even more preferably between 300 nm and 1100 nm.

Preferably the source of illumination emits light comprising electromagnetic radiation having at least one wavelength between 380 nm and 780 nm. That is, preferably the source of illumination is a light source and the beam is a beam of light.

Preferably the source of illumination emits a range of wavelengths and wherein the beam comprises the same range of wavelengths as the source of illumination or a narrower range of wavelengths of the source of illumination. Preferably the apparatus comprises a filter positioned to filter the range of wavelengths emitted by the source of illumination such that the beam has a narrower range of wavelengths compared to the range of wavelengths emitted by the source of illumination.

Preferably the source of illumination comprises at least one light emitting diode, in particular an infrared, red, green, yellow or blue light emitting diode.

Preferably the source of illumination comprises at least one incandescent light source such as a tungsten filament light bulb.

Preferably the source of illumination comprises at least one laser.

Preferably the apparatus comprises at least on aperture device to stop the source of illumination such that the beam is a stopped beam.

Preferably the source of illumination comprises diffusing means to increase an effective size of the source of illumination.

Preferably the source of illumination comprises a lens for providing the converging beam.

Preferably the apparatus comprises a beam splitter to direct the beam from the source of illumination onto the surface of the sheet of glass being measured.

Preferably the image capture device comprises a camera, more preferably a digital camera. Preferably the digital camera comprises a line scan camera or an area scan camera.

Preferably the apparatus comprises a controller for controlling at least one of the source of illumination, the image capture device, the adjustment means, the focusing means and the moving means.

Preferably the apparatus comprises a computer and images taken by the camera are processed by software installed on the computer to determine a parameter related to the defect. Preferably the parameter is a parameter related to the shape of the defect. Preferably the parameter is a parameter related to the brightness of the defect in the image relative to the brightness of the glass surrounding the defect in the image. Preferably the parameter is a parameter related to the colour or hue of the defect in the image relative to the colour or hue of the glass surrounding the defect in the image.

In embodiments where the apparatus comprises moving means to move the image capture device from a first position relative to the defect to a second position relative to the defect, it is preferred that the moving means can move the image capture device in a direction parallel to a normal extending from the first major surface of the sheet of glass being measured to be closer or further away from the first major surface of the sheet of glass being measured.

The moving means may be configured to move the image capture device from the first position to detect a first defect in a sheet of glass being measured to the second position relative to the first defect to detect a second defect in the sheet of glass, the first defect being different to the second defect.

The image capture device may be movable and/or the glass sheet to be measured may be mounted on a movable support such that the apparatus further comprises the movable support.

In some embodiments the adjustment means for adjusting the focal point of the converging beam to the second focal point while the image capture device remains focused onto the first plane comprises a lens, more preferably a computer adjustable lens.

In such embodiments the lens is positioned such that the beam from the source of illumination passes through the lens before striking the first major surface of the sheet of glass being measured.

In some embodiments the apparatus comprises a lens, more preferably a computer adjustable lens, for adjusting the focal point of the converging beam to the second focal point while the image capture device remains focused onto the first plane and a beam splitter.

In such embodiments it is preferred that the lens is between the source of illumination and the beam splitter. Alternatively, it is preferred that the beam splitter is between the lens and the source of illumination.

In some embodiments the apparatus comprises focusing means for focusing the image capture device onto a second plane to image the defect with the image capture device focused onto the second plane.

Preferably the focusing means comprises a lens, more preferably a computer adjustable lens. The lens is arranged between the first major surface of the sheet of glass being measured and the image capture device.

Preferably the apparatus further comprises a beam splitter to alter the direction of the beam from the source of illumination.

Preferably the lens for focusing the image capture device onto a second plane is positioned between the beam splitter and the image capture device.

Preferably the lens for focusing the image capture device onto a second plane is positioned between the beam splitter and the first major surface of the sheet of glass being measured.

In some embodiments the apparatus comprises a light source for illuminating a portion of the surface of the sheet of glass containing the defect with a converging light beam having a first focal point; an image capture device to take a first image of the illuminated defect when the image capture device is at a first position relative to the defect and focused onto a first plane; and at least one of an adjustment means for adjusting the focal point of the converging beam of light to a second focal point while the image capture device remains focused onto the first plane, a focusing means for focusing the image capture device onto a second plane to image the defect with the image capture device focused onto the second plane and a moving means for moving the image capture device to a second position relative to the defect.

BRIEF DESCRIPTION OF THE FIGURES

Embodiments of the present invention will now be described by way of example only with reference to the accompanying drawings, in which:

FIG. 1 shows a schematic cross-sectional representation of an apparatus for carrying out a method in accordance with the present invention;

FIG. 2 shows a schematic representation of a first image (FIG. 2a) and a second (2b) of a defect taken with the apparatus shown in FIG. 1;

FIG. 3 shows a sequence of images of a defect taken with the apparatus shown in FIG. 1 with different levels of optical power added to the system.

DETAILED DESCRIPTION OF THE INVENTION

Figure 4:
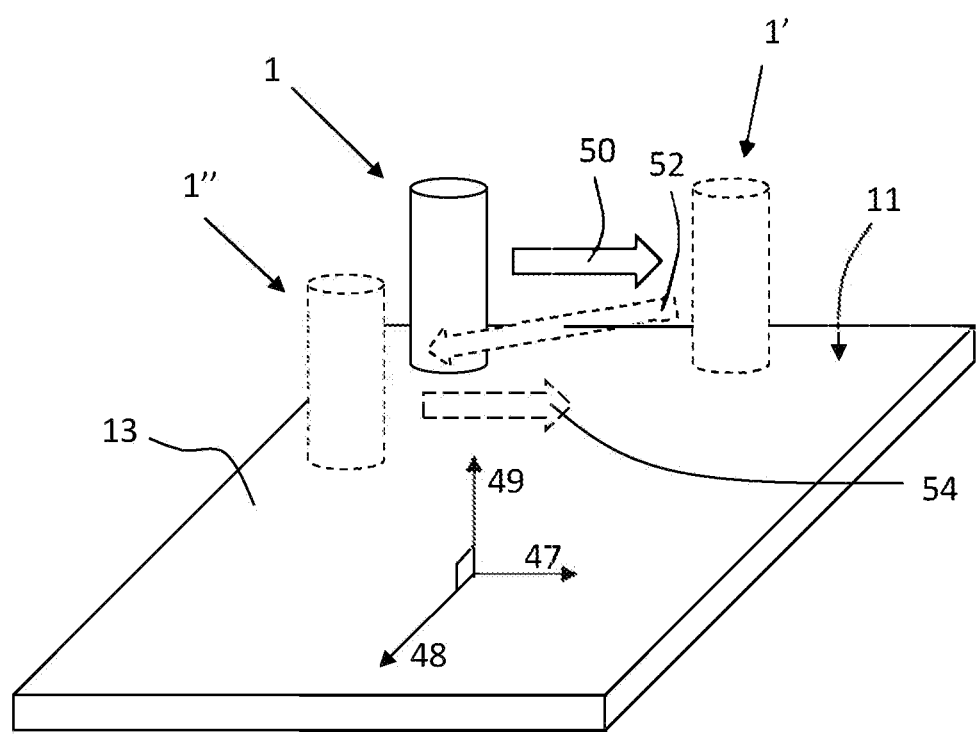
FIG. 4 shows a schematic isometric view of the apparatus shown in FIG. 1 used to scan a surface of a glass sheet.

FIG. 1 shows a schematic cross-sectional representation of an apparatus for carrying out a method in accordance with the present invention.

The apparatus 1 comprises a light emitting diode (LED) light source 3 producing a diverging light beam 5 that is reflected through 90° by a beam splitter 7. The reflected light passes through a lens 9 and a suitable lens 9 is a Nikon EL-NIKKOR lens 50 mm F/2.8. The lens 9 converges the reflected light beam onto major surface 11 of the glass sheet 13. The major surface 11 of the glass sheet 13 is opposite the major surface 15 of the glass sheet 13. Before striking the major surface 11 the beam of light focused by lens 9 also passes through a computer adjustable lens 17. A suitable computer adjustable lens 17 is an Optotune EL-16-40-TC-VIS-5D-C.

As can be seen from FIG. 1, the apparatus 1 is arranged such that the lens 9 is between the beam splitter 7 and the computer adjustable lens 17. The lens 9 is between the major surface 11 and the beam splitter 7. The computer adjustable lens 17 is between the major surface 11 and the beam splitter 7.

The beam 5 has an optical axis that strikes the major surface 11 at an angle of incidence greater than 45°, preferably between 50° and 140°, more preferably between 80° and 100°. Preferably the optical axis of the beam strikes the major surface at normal, or substantially normal incidence. Shallow angles of incidence are not preferred because such illumination conditions may illuminate defects such as dust and scratches on the major surface 11 to a greater extent thereby reducing sensitivity of the method to defects of interest.

The light reflected by the major surface 11 of the glass sheet 13 passes back through the computer adjustable lens 17 and the lens 9, through the beam splitter 7 and travels on to a digital camera 19. In this example the digital camera 19 is an area camera, a suitable example thereof being a Teledyne Dalsa Genie Nano M1920 digital camera.

If an infrared emitting solid state device (i.e. an infrared emitting LED) is used instead of the LED light source 3, a suitable camera sensitive to infrared radiation emitted by the infrared emitting solid state device is used to capture images of the illuminated defect. As will be readily apparent, an image capture device that is suitable for capturing an image of a defect illuminated by a beam from the particular source of illumination is used to carry out the method of the present invention.

To image defects on or close to the major surface 11 of the glass sheet 13, the digital camera 19 is focused onto the major surface 11.

In order to focus the digital camera 19 onto the major surface 11 the distance between the digital camera 19 and the major surface 11 is required and this distance is measured using a laser triangulation sensor such as a Micro-Epsilon optoNCDT ILD1420 to allow accurate focusing.

The distance to the major surface 11 from the digital camera 19 is then used to adjust the computer adjustable lens 17 so that the major surface 11 the glass sheet 13 is kept precisely in focus.

A controlled amount of negative optical power (for example about −0.2 dioptres) is then added by the computer adjustable lens 17 as it has been found that this makes the optical system sensitive to distortion of the glass surface around the defect of interest.

It has been found that the use of converging illumination from lens 9 with the addition of optical power by the computer adjustable lens 17 causes the image of certain defects obtained by digital camera 19 to appear bright compared to the surrounding image of the glass. It has been found that certain particles such as tin containing particles cause a concave-like localised distortion of the glass surface 11 around the particle that may be used to determine the presence of such defects optically, even when the particles themselves have small dimensions, such as less than 50 µm.

It is thought particles that affect the surface profile of the glass sheet locally around the particle will have been deposited onto the glass surface when the glass sheet was at a sufficiently high temperature so that the glass viscosity was low enough for the deposition of the particle to alter the surface shape or profile around the particle. One such example is a particle containing tin, or a particle of tin, which may be formed in the float bath when a glass sheet is formed using a float process. As the glass viscosity increases as the glass is cooled during the forming process, the surface profile around the particle becomes "frozen-in" to cause the defect in the sheet of glass. Even if the particle that caused the surface profile of the glass sheet to change locally around the particle is later removed (for example because the particle was only weakly attached to the surface of the sheet of glass), a defect is still present in the sheet of glass due to the aforementioned localised surface profile change.

Dust and dirt that may be on the major surface 11 typically appear darker than the surrounding image of the glass. Such defects are typically deposited onto the major surface 11 when the glass has been cut into sheets, for example during handling and/or transportation of the glass sheet.

By scanning the glass sheet 13, regions of the surface 11 with a bright defect compared to the image of the surrounding glass sheet may be identified using suitable image processing software.

Advantageously the apparatus 1 is arranged to have a short depth of field so that the image captured by the digital camera 19 does not show defects in the body of the glass or on the opposite major surface 15 for a glass sheet having a thickness of at least about 1.5 mm. Consequently, using the system as described above may be used to detect the presence of defects on or close to the surface of the major surface 11. Such defects may be at least partially below the major surface 11.

Once an image has been taken that shows a defect that appears bright compared to the surrounding glass image, the image may be further processed to help further determine the type of defect and to differentiate the defect from other types of defect.

For example, under the illumination conditions described above it has been found that scratches in the major surface 11 also show up as brighter than the image of the surrounding glass sheet. To discriminate scratches from other types of defect, further image processing may be used to determine at least one parameter related to the shape of the defect in the image captured by the digital camera 19.

One particularly useful parameter related to the shape of the defect is the aspect ratio. For example, a scratch is typically narrow and long. A defect such as a tin containing particle, or a particle of tin, is typically spherical, so has a circular profile in the image captured by the camera. The degree of circularity of the defect may also be used as a parameter to discriminate between different types of defect, for example by using a ratio of the area of the defect to the perimeter of the defect in the image obtained by the digital camera 19. One such measure of circularity is:

$$\text{circularity} = \frac{(\text{perimeter}^2)}{(4\pi \times \text{area})}$$

which for a perfect circle has a circularity of 1 and the higher the circularity, the less circular the defect is. For a digital image of the defect, the perimeter and area of the defect can be determined by simply counting pixels.

To further help reduce any mis-classification of a particular defect, the method of the present invention includes a step where a second image of the defect is taken with the controlled level of negative optical power provided by the computer adjustable lens 17 removed and preferably adding a predetermined amount of positive optical power such as 0.2 dioptres using the same computer adjustable lens 17.

The first and second images containing the same defect are then compared. As discussed above, certain defects such as tin, or tin containing defects, that have been deposited on the surface of the glass during forming cause the glass surface to be distorted locally (i.e. from flat to concave-like) cause the light reflection therefrom to be adjusted depending upon the degree of focusing. In the defocussed image when negative optical power was applied the image of the defect appears bright compared to the image of the surrounding glass, whereas when the defect is in focus, or positive optical power is applied using the computer adjustable lens 17, the image of the defect appears dark compared to the image of the surrounding glass.

The apparatus 1 can then be used, together with a suitable image processing step, to be insensitive to dust, dirt, scratches and all other defects apart from defects that have locally affected the surface of the glass sheet when deposited thereon, such as tin defects, or tin containing defects.

The method of the present invention can be applied to glass moving relative to the optical system by using a short exposure time on the camera and/or a short illumination time on the light source to freeze the relative motion. To cover a large area of glass the optical system can be raster scanned over the glass, or a number of optical systems can be used in combination to cover the required area.

In an alternative to the apparatus shown in FIG. 1, the computer adjustable lens 17 may be positioned in between the beam splitter 7 and the lens 9.

In another alternative to the apparatus shown in FIG. 1, the computer adjustable lens 17 may be positioned in between the beam splitter 7 and the digital camera 19.

In another alternative to the apparatus shown in FIG. 1, the computer adjustable lens 17 may be positioned in between the beam splitter 7 and the light source 3.

The computer adjustable lens 17 provides a quick way to add negative optical power to the light beam that illuminates the major surface 11 and is a faster way of controlling the degree of defocus of the imaging system i.e. digital camera 19.

To add negative optical power instead of using a computer adjustable lens 17, the camera may be focused into the body of the glass sheet 13 instead. However, to adjust the focus to carry out the further distinguishing step where positive optical power is added, the camera focus is then adjusted to be above the major surface 11. Moving the camera focus is a way to add negative or optical power but is slow compared to using the computer adjustable lens 17.

A similar effect can be obtained by using lenses having fixed focal lengths, but this takes time to replace lenses.

In other embodiments the digital camera 19 may be movable towards or away from the first major surface 11.

In other embodiments the light source may be movable towards or away from the beam splitter 7 such that the optical path from the light source to the first major surface 11 is adjustable. In the embodiment shown in FIG. 1, the apparatus 1 includes a housing 21 inside which the LED 3, the beam splitter 7, the lens 9, the computer adjustable lens 17 and the digital camera 19 are contained. Also contained inside the housing 21 is a controller 23 that is used to control the operation of the LED 3 and the computer adjustable lens 17. The controller 23 is also used to control the operation of the digital camera 19.

The controller 23 is in electrical communication with the LED 3 via cable 25. The controller 23 is in electrical communication with the computer adjustable lens 17 via cable 27. The controller 23 is in electrical communication with the digital camera 19 via cable 29. The controller 23 is also in electrical communication with a computer 31 via cable 33.

The computer 31 can be provided with software to control the operation of the LED 3, the computer adjustable lens 17 and the digital camera 19 via the controller 23. Images taken by the digital camera 19 may also be sent to the computer 31 via the controller 23 along cables 29, 33. The software may include image processing software to help identify and discriminate the defect as described above, for example by determining a shape parameter of the defect such as circularity.

FIG. 2*a* shows a schematic representation of part of an image taken by the digital camera 19 of a portion of the surface 11 where a spherical tin particle was deposited during forming the glass sheet, the spherical tin particle having caused a local shape change of the glass surface around the tin particle from flat to concave-like. In the image the defect 40 has a circular profile. The glass surrounding the defect 40 is also included in the image and labelled 42. In FIG. 2*a*, the defect 40 is bright compared to the glass 42 surrounding the defect and is from an image taken with the apparatus 1 when the digital camera 19 is focused on the major surface 11 of the glass sheet 13 and a controlled amount of negative optical power of about 0.2 dioptres is added by computer adjustable lens 17.

Using the image of FIG. 2*a*, the computer 31 of FIG. 1 is used to carry out the additional image processing as discussed above, for example to determine the circularity of the defect in the image. The image processing step is able to determine that the defect is a certain type and not another type that is not of interest. For example, when looking for certain defects due to tin or tin-containing particles that have a spherical shape and have been deposited on the glass surface, the image processing step is used to determine that the defect has a degree of circularity that indicates the defect is circular (and so spherical) and that further inspection is required. If the image processing step determines that the defect was a scratch, further inspection may not be required.

The apparatus 1 is then used to take another image of the same defect with the computer adjustable lens 17 used to provide positive optical power of about 0.2 dioptres (instead of being used to add about 0.2 dioptres of negative optical power).

FIG. 2*b* shows a schematic representation of part of the image taken by the digital camera 19 of the circular defect 40 when the apparatus 1 is used with about 0.2 positive optical power provided by the computer adjustable lens 17. All other illumination conditions were the same as used to take the image shown in FIG. 2*a*.

The circular defect in the image is now dark compared to the surrounding glass. In FIG. 2*b*, the glass surrounding the defect is still labelled 42 but the defect is labelled 40'.

FIG. 3 shows a sequence of images (a)-(g) of another defect that has been identified using the apparatus 1.

In FIG. 3(*a*) the apparatus 1 is configured with the digital camera 19 focused on the major surface 11 and 0.3 dioptres negative optical power added to the system using the computer adjustable lens 17. As can be seen, the defect is circular and is brighter (a lighter shade of grey) than the image of the glass surrounding the defect.

In FIG. 3(*b*) the apparatus 1 is configured in the same way as when the image in FIG. 3(*a*) was taken with the exception that 0.2 dioptres negative optical power was added to the system using the computer adjustable lens 17 (instead of 0.3 negative optical power). As can be seen, the defect is brighter (a lighter shade of grey) than the image of the glass surrounding the defect.

In FIG. 3(*c*) the apparatus 1 is configured in the same way as when the image in FIG. 3(*a*) was taken with the exception that about 0.1 dioptres negative optical power was added to the system using the computer adjustable lens 17 (instead of 0.3 negative optical power). The defect is in focus and appears dark compared to the image of the glass surrounding the defect.

In FIG. 3(*d*) the apparatus 1 is configured in the same way as when the image in FIG. 3(*a*) was taken with the exception that no optical power was added to the system using the computer adjustable lens 17. As can be seen, the defect is darker (a darker shade of grey) than the image of the glass surrounding the defect.

In FIG. 3(*e*) the apparatus 1 is configured in the same way as when the image in FIG. 3(*a*) was taken with the exception that 0.1 dioptres positive optical power was added to the system using the computer adjustable lens 17. As can be seen, the defect is darker (a darker shade of grey) than the image of the glass surrounding the defect and is slightly larger than the image of the defect in FIG. 3(*d*) because the amount of defocus from the glass surface 11 has increased.

In FIGS. 3(*f*) and 3(*g*) the apparatus 1 is configured in the same way as when the image in FIG. 3(*a*) was taken with the exception that 0.2 dioptres positive optical power and 0.3 dioptres positive optical power respectively was added to the system using the computer adjustable lens 17. As can be seen in both images, the defect is darker (a darker shade of grey) than the image of the glass surrounding the defect. Also, in each image the image of the defect is slightly larger than the image of the defect in FIG. 3(*e*) because the amount of defocus from the glass surface 11 has increased. The image of the defect in FIG. 3(*g*) is larger than the image of the defect in FIG. 3(*f*) because more positive optical power was added to the system using the computer adjustable lens 17 when the image in FIG. 3(*g*) was taken compared to when the image in FIG. 3(*f*) was taken.

The sequence of images 3(*a*) to 3(*g*) illustrate how a defect of interest may be differentiated from other defects that do not distort the surface of the surrounding glass, so do not appear bright or dark relative to the image of the surrounding glass when the amount of optical power is adjusted from a negative amount of optical power to a positive optical power.

As mentioned above, optical power added to the system using the computer adjustable lens 17 is more convenient and quicker than adjusting the point at which the digital camera 19 focusses.

FIG. 4 is a schematic representation showing how the apparatus 1 may be used to scan an entire glass sheet 13 for defects on or in the major surface 11. In this example the glass sheet 13 is rectangular and is static relative to the apparatus 1. In this example the apparatus 1 is as shown in FIG. 1.

In this example the glass sheet 13 is flat and has a major surface 11, but the glass sheet 13 may be curved. On the major surface 11 is a first axis 47 and a second axis 48 orthogonal thereto. A third axis 49 extends from the major surface 11 and is orthogonal to both the first and second axes 47, 48.

The optical axis of the beam 5 striking the major surface 11 is preferably substantially parallel to the third axis 49.

The apparatus 1 can be moved using a suitable X-Y stage or robot arm (not shown) to move the apparatus in the direction of arrow 50 to obtain images of the glass sheet 13 using the digital camera 19. The direction of arrow 50 in this example is parallel to a lateral edge of the glass sheet 13 and parallel to the first axis 47.

The entire glass sheet 13 may be scanned by moving the apparatus 1 in raster fashion, for example when the apparatus 1 reaches the end of the first pass (shown there with the label 1'), the apparatus may be moved in the direction of arrow 52 to the position shown as 1" to scan along the path shown by arrow 54, and so on. The path of arrow 50 and the path of arrow 54 are parallel to each other and both are parallel to the first axis 47.

In the images acquired with negative optical power added to the system, regions where a bright defect compared to surrounding glass (for example as shown in FIGS. 2 and 3), are further analysed to determine how circular the image is, and to determine if the image of the defect changes as illustrated in FIGS. 3(a)-3(g). This can be done when a defect of interest is identified, or after the entire glass sheet has been scanned. In this latter embodiment, the position of each image where a bright defect was identified is recorded so the apparatus can go back to that position to carry out the steps shown in FIGS. 3(a)-3(g).

To speed up the operation, it is possible to only use the computer adjustable lens 17 to provide a predetermined negative optical power in the first scan (for example −0.3 dioptres) and to then use a single predetermined positive optical power (for example +0.3 dioptres) to see if the image of the defect changes as illustrated in FIGS. 2a and 2b.

Instead of the apparatus 1 moving across the surface 11 of the glass sheet 13, the glass sheet 13 may be positioned on a suitable movable support to move the glass sheet 13 relative to the apparatus 1. Each of the apparatus 1 and the glass sheet 13 may move during the scanning process.

In another embodiment, the apparatus 1 only traverses across the glass sheet along a fixed path and the glass sheet 13 is moved along a path perpendicular to the path traversed by the apparatus 1. Such an embodiment is particularly useful when the glass sheet 13 is in the form of a moving ribbon of glass as is formed in a float process on a bath of molten tin, whereby the apparatus may be positioned downstream of the bath of molten tin and scanned thereafter, preferably before the glass ribbon has been cut into individual sheets. The apparatus 1 may scan across the ribbon width at a rate commensurate with the ribbon speed so that lengths of the ribbon may be scanned because the ribbon moves in a direction of conveyance after a scan across the ribbon width has been carried out.

In another embodiment, two or more apparatus as shown in FIG. 1 are used to scan different parts of the glass sheet or glass ribbon.

In another embodiment, the apparatus 1 is also movable in a direction parallel to the axis 49. In such an embodiment it is not essential to use the computer adjustable lens 17 to provide positive and negative optical power, instead the apparatus 1 can be moved toward and away from the major surface 11 in a direction parallel to the third axis 49 to position the image capture device to acquire first and second images of a defect in the sheet of glass 13.

The present invention is particularly useful to determine the presence of defects in a sheet of glass where a particle has been deposited on the sheet of glass when the glass was at a sufficiently low viscosity (i.e. during forming the glass sheet) to locally distort the shape of the surface of the glass around the deposited particle. The local shape distortion of the surface of the glass around the particle adjusts the path of light illuminating the defect differently depending upon the degree of convergence of the incident light beam and this may be used to discriminate this type of defect. The local shape distortion of the surface of the glass around the particle remains even if the particle subsequently becomes removed from the sheet of glass. Using the optical effect associated with local shape distortion of the surface of the glass around the particle also allows smaller defects to be identified because the optical effect is large even when the particle creating the local shape distortion of the surface of the glass around the particle is small.

The invention claimed is:

1. A method of detecting a defect in a sheet of glass, the sheet of glass having a first major surface and a second opposing major surface, the method comprising the steps:
   (i) directing a beam from a source of illumination onto the first major surface of the sheet of glass to illuminate the defect in the sheet of glass, the beam that strikes the first major surface of the sheet of glass being a converging beam having a first focal point;
   (ii) focusing an image capture device onto a first plane to image the defect in the sheet of glass, the image capture device being at a first position relative to the defect;
   (iii) using the image capture device to capture a first image of the defect, the first image comprising a first portion from the illuminated defect and a second portion due to reflection of at least a portion of the beam from the first major surface of the sheet of glass;
   (iv) carrying out an adjustment step;
   (v) using the image capture device to capture a second image of the defect, the second image comprising a first portion from the illuminated defect and a second portion due to reflection of at least a portion of the beam from the first major surface of the sheet of glass;
   wherein in the first image of the defect the first portion is brighter than the second portion, and in the second image of the defect the first portion is darker than the second portion.

2. The method according to claim 1, wherein the adjustment step comprises at least one of (i) adjusting the first focal point of the converging beam to a second focal point so that the beam striking the first major surface is a converging beam having the second focal point; (ii) focusing the image capture device onto a second plane to image the defect with the image capture device focused onto the second plane; and (iii) moving the image capture device to a second position relative to the defect.

3. The method according to claim 1, wherein the first plane is aligned with the first major surface of the sheet of glass.

4. The method according to claim 1, wherein at step (i) positive optical power is added to the beam before the beam strikes the first major surface of the sheet of glass; and/or wherein at step (i) negative optical power is added to the beam before the beam strikes the first major surface of the sheet of glass.

5. The method according to claim 1, wherein at step (iv) negative optical power is added to the beam after the beam strikes the first major surface of the sheet of glass.

6. The method according to claim 1, wherein at step (iv) the image capture device remains focused onto the first plane.

7. The method according to claim 1, wherein at step (iv) the image capture device remains at the first position relative to the defect such that at step (v) the second image of the defect is taken with the image capture device at the first position relative to the defect.

8. The method according to claim 1, wherein the defect comprises a localised shape change of the first major surface of the sheet of glass, the localised shape change of the first major surface of the sheet of glass being caused by a particle that was deposited onto the first major surface of the sheet of glass during the formation of the sheet of glass; and/or wherein the particle is spherical.

9. The method according to claim 8, wherein the particle is at least partially submerged beneath the first major surface of the sheet of glass or wherein the particle that caused the localised shape change of the first major surface of the sheet of glass is not in the sheet of glass when any or all of the steps (i), (ii), (iii), (iv) or (v) are carried out.

10. The method according to claim 1, wherein the first image is a monochromatic image; and/or wherein the second image is a monochromatic image.

11. The method according to claim 1, wherein the defect has a major axis having a length less than 200 μm; and/or wherein the defect being detected has a major axis having a length greater than 0.5 μm.

12. The method according to claim 1, wherein the first plane is aligned with the first major surface of the sheet of glass, and wherein prior to step (ii) the method includes a distance measuring step to determine a position of the first major surface of the sheet of glass relative to the image capture device so that during step (ii) the image capture device can be focused onto the first major surface of the sheet of glass.

13. The method according to claim 1, wherein the defect being detected is a first defect of a plurality of defects in the sheet of the glass, the plurality of defects also comprising at least a second defect, the first defect being detected initially by carrying out steps (i) (ii) and (iii) and then the second defect being detected by carrying out steps (i) (ii) and (iii), thereafter steps (iv) and (v) being carried out to detect the first defect, followed by steps (iv) and (v) being carried out to detect the second defect.

14. The method according to claim 1, wherein the beam that illuminates the first major surface shares an optical axis with at least a reflected ray from the first major surface of the sheet of glass to the image capture device.

15. The method according to claim 1, wherein the sheet of glass has been produced using a float process, and wherein the first major surface has not been in contact with molten tin when the sheet of glass was formed.

16. The method according to claim 1, wherein the beam is a stopped beam from the source of illumination, the stopped beam passing through a least a first aperture positioned between the source of illumination and the first major surface of the sheet of glass.

17. An apparatus for determining the presence of a defect in a sheet of glass, the sheet of glass having a first major surface and a second opposing major surface, the apparatus comprising:
   a source of illumination;
   an image capture device; and
   a computer with imaging processing software;
   wherein the apparatus is configured:
      to direct a beam from the source of illumination onto the first major surface of the sheet of glass to illuminate a portion of the first major surface of the sheet of glass containing the defect with a converging beam having a first focal point;
      to capture a first image of the illuminated defect with the image capture device when the image capture device is at a first position relative to the defect and focused onto a first plane, the first image comprising a first portion from the illuminated defect and a second portion due to reflection of at least a portion of the beam from the first major surface of the sheet of glass;
      to carry out an adjustment step via at least one of an adjustment means for adjusting the focal point of the converging beam of light to a second focal point while the image capture device remains focused onto the first plane, a focusing means for focusing the image capture device onto a second plane to image the defect with the image capture device focused onto the second plane and a moving means for moving the image capture device to a second position relative to the defect;
      to capture a second image of the defect with the image capture device, the second image comprising a first portion from the illuminated defect and a second portion due to reflection of at least a portion of the beam from the first major surface of the sheet of glass; and
      to identify, via the image processing software of the computer, when the first portion of the first image is brighter than the second portion of the first image, and when the first portion of the second image is darker than the second portion of the second image to determine the presence of the defect.

18. The apparatus according to claim 17, wherein adjustment means for adjusting the focal point of the converging beam to a second focal point while the image capture device remains focused onto the first plane comprises a lens; and/or wherein the focusing means for focusing the image capture device onto a second plane to image the defect with the image capture device focused onto the second plane comprises a lens.

19. The apparatus according to claim 17, further comprising a controller for controlling at least one of the source of illumination, the image capture device and the means of adjusting the focal point of the converging beam to a second focal point while the image capture device remains focused onto the first plane; and/or wherein images taken by the image capture device are processed by software installed on the computer to determine a parameter related to the defect.

20. The apparatus according to claim 17, wherein the apparatus comprises moving means for moving the image capture device from the first position relative to the defect to the second position relative to the defect, further wherein the moving means can move the image capture device in a direction parallel to a normal extending from the first major surface of the sheet of glass being measured to be closer or further away from the first major surface of the sheet of glass being measured; and/or wherein the moving means is configured to move the image capture device from the first position to detect a first defect in a sheet of glass being measured to the second position relative to the first defect to detect a second defect in the sheet of glass.

* * * * *